United States Patent [19]

Cogan et al.

[11] Patent Number: 4,831,922

[45] Date of Patent: May 23, 1989

[54] AUTOMATED SYSTEM FOR PROCESSING WHOLE POTATOES

[75] Inventors: Kevin C. Cogan, Carrollton; Robert M. Echols, Copper Canyon; Tina T. Dierl, Coppell, all of Tex.

[73] Assignee: Frito-Lay Inc., Dallas, Tex.

[21] Appl. No.: 198,553

[22] Filed: May 25, 1988

[51] Int. Cl.$^4$ .............................................. A23N 7/00
[52] U.S. Cl. ........................................ 99/486; 99/567; 99/584; 99/630; 250/572; 356/237; 356/376; 358/106
[58] Field of Search ................. 99/485, 484, 486, 489, 99/537, 600, 567, 584, 623, 629, 630; 426/482, 483; 250/572; 356/237, 376; 358/106

[56] References Cited

U.S. PATENT DOCUMENTS

| | | | |
|---|---|---|---|
| 3,480,057 | 11/1969 | Wilhelm | 99/584 X |
| 4,023,477 | 5/1977 | Hirahara et al. | 99/630 |
| 4,136,781 | 6/1979 | Perry et al. | 209/552 |
| 4,171,164 | 10/1979 | Groves et al. | 99/486 |
| 4,450,760 | 5/1984 | Wilson | 99/567 X |
| 4,485,912 | 12/1984 | Carmichael et al. | 198/382 |
| 4,520,702 | 6/1985 | Davis et al. | 83/71 |
| 4,541,331 | 9/1985 | Narisawa et al. | 99/584 X |
| 4,570,074 | 2/1986 | Jette | 250/572 X |
| 4,581,632 | 4/1986 | Davis et al. | 358/106 |
| 4,687,326 | 8/1987 | Corby, Jr. | 356/376 X |
| 4,735,323 | 4/1988 | Okada et al. | 356/231 X |

Primary Examiner—Timothy F. Simone
Attorney, Agent, or Firm—Bernard, Rothwell & Brown

[57] ABSTRACT

An automated system for processing whole potatoes maintains a substantially constant mass flow of potatoes into an adjustable potato peeler that is capable or removing from the potatoes varying amounts of potato peel. Peeled potatoes are conveyed downstream of the peeler, while being electromagnetically inspected to determined the uniformity of peel removal, the presence of unacceptable material, and to identify oversized potatoes that exceed a predetermined size limitation. A diverter gate separates oversized potatoes and foreign materials from potatoes that have been identified as satisfactory.

10 Claims, 1 Drawing Sheet

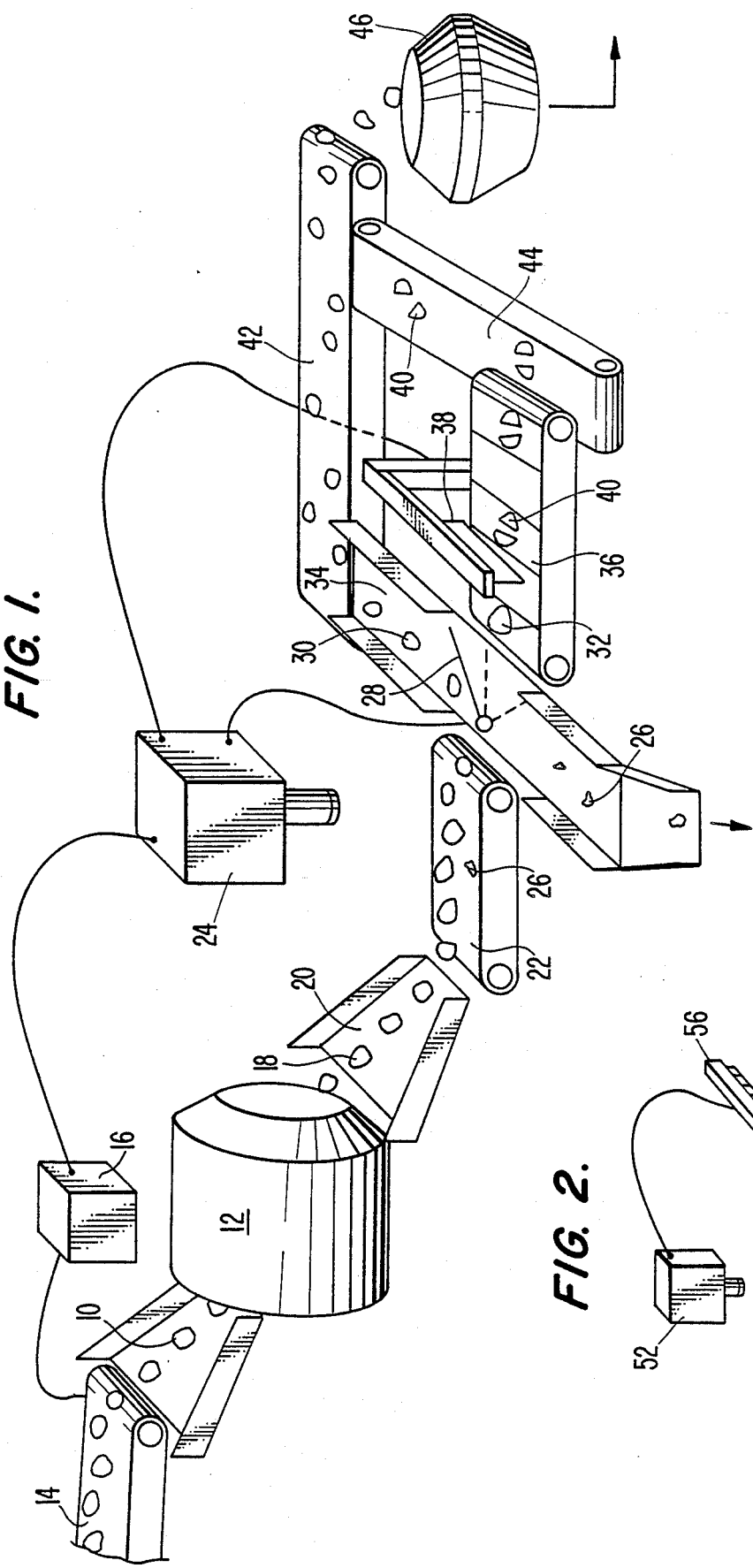
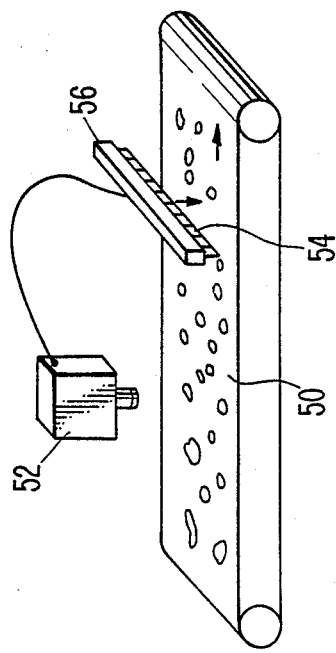

AUTOMATED SYSTEM FOR PROCESSING WHOLE POTATOES

BACKGROUND OF THE INVENTION

1. Field of the Invention

The present invention relates to improvements in preparing whole raw potatoes for slicing during commercial production of potato chips.

2. Description of the Background Art

Commercial potato chips typically are produced from whole raw potatoes that are sliced utilizing high speed rotary slicers such as the Urschel TM model CC. Before introducing potatoes into such automatic slicers, it is desirable to separate from the potatoes any foreign material, such as rocks, woods, metal and the like, as well as unacceptable potatoes. Because potatoes vary considerably in size, it is also desirable to select out excessively large potatoes that might jam the slicer. In the past, removal of foreign materials and over-size potatoes generally involved a considerable amount of manual labor.

Most processes for the production of potato chips include peeling of the whole potatoes prior to slicing, which advantageously is performed by mechanical peeler machinery in order to increase efficiency and reduce labor costs. In order to avoid waste, it is desirable to remove as much peel from the potato as possible, while retaining the maximum amount of potato flesh. For a given potato size and peel rate, mechanical peelers can usually be manually adjusted to optimally remove a maximum amount of peel with as little potato flesh as possible. However, on-line variations in potato feed rate, potato size and the like often results in insufficient peel removal or excessive waste of the potato flesh.

There remains a need in the art for improved systems for preparing whole potatoes during processes for producing potato chips.

SUMMARY OF THE INVENTION

In accordance with the present invention, an automated vision system for processing whole potatoes comprises an adjustable potato peeler capable of removing varying amounts of potato peel from whole raw potatoes. Means are provided for feeding unpeeled potatoes into the peeler, and for maintaining a substantially constant mass flow of potatoes into the peeler. Peeled potatoes are received from the peeler and conveyed downstream therefrom. Means are provided for optically inspecting potatoes downstream of the peeler and for adjusting the potato peeler so as to remove substantially uniform amounts of potato peel from the potatoes. Unacceptable materials that may be present within the potatoes downstream of the peeler are electromagnetically identified, and the potatoes are electromagnetically inspected to locate oversize potatoes that exceed a predetermined size limitation. A diverter is provided for separating unacceptable materials from the acceptable potatoes and the oversize potatoes.

BRIEF DESCRIPTION OF THE DRAWINGS

FIG. 1 is a perspective, somewhat schematic view of an automated vision system for processing whole potatoes in accordance with one embodiment of the present invention.

FIG. 2 is a perspective, somewhat schematic view of a portion of an automated vision system according to a second embodiment of the invention.

DETAILED DESCRIPTION OF THE PREFERRED EMBODIMENTS

Various means may be used to control the rate at which the potatoes are processed. One such suitable means is shown in FIG. 1. A variable speed weighbelt 14 feeds unpeeled, whole raw potatoes 10 into a mechanical potato peeler 12 that is capable of being adjusted for removing varying amounts of potato peel from the potatoes.

Weighbelt 14 maintains a constant mass flow of potatoes into the peeler under the control of peeler-controller 16 by varying weighbelt speed as a function of the weight of the potatoes thereon or by varying the weight of the potatoes thereon or by varying the speed of some other conveyor upstream.

After passing through peeler 12, peeled whole potatoes 18 exit the peeler, proceed down a slide 20, and are received on an inspection conveyer 22 for advancement downstream of the peeler.

Means for electromagnetically inspecting potatoes is provided downstream of the peeler. In preferred embodiments, the potato-inspecting means is an optical inspection means, such as camera/controller 24, positioned downstream of the peeler for detecting the amount of peel that is removed from the potatoes by peeler 12. Camera/controller 24 can be any suitable optical inspection and control device, such as optical viewers sold under the name OPTI-SORT TM, manufactured by the Simco-Ramic Company of Medford, Ore. A patent illustrating one such optical inspection system is U.S. Pat. No. 4,581,632 to Davis et al. entitled "Optical Inspection Apparatus for Moving Articles."

Camera/controller 24, in conjunction with peeler-controller 16, automatically adjusts the potato peeler 12 so as to achieve substantial uniformity of peel removal while maximizing the amount of potato peel removed from the potatoes and minimizing the amount of potato flesh lost as waste.

In the embodiment shown in FIG. 1, camera/controller 24 further is a means for identifying undesirable material 26, such as stones, wood, metal, or undesirable green potatoes, that may be present with the potatoes on the inspection conveyor downstream of the peeler. In other embodiments, an optical or other means separate from camera/controller 24 is provided for identifying undesirable material present with the potatoes.

In the embodiment illustrated in FIG. 1, camera/controller 24 also is a means for optically inspecting whole potatoes downstream of the peeler to identify oversized potatoes that exceed a predetermined size limitation, e.g., 4 inches in length. In other embodiments, an optical vision system separate from camera/controller 24 is utilized to identify oversized potatoes.

Downstream of inspection conveyor 22 is a diverter gate 28 that, under the control of camera/controller 24, separates acceptable potatoes 30, oversized potatoes 32 and unacceptable materials 26. Potatoes detected as being oversized by camera/controller 24 are directed onto the oversized potato conveyor 36, whereas unacceptable material detected by camera/controller 24 is directed down chute 38 to a refuse location.

Conveyor 36 transports oversized potatoes 32 to a potato slicing mechanism 38 that divides the oversized potatoes into potato pieces 40 that are within a predetermined acceptable size limitation, e.g., less than 4 inches long. Advantageously, oversize potatoes are cut into pieces that are the best (largest possible) size for the particular slicer being used downstream.

Diverter gate 28 directs acceptable potatoes down chute 34 onto a weighbelt 42, that also receives via conveyor 44 acceptably sized pieces 40 cut from oversized potatoes 32. Alternatively, potato pieces 40 can be conveyed onto the inspection conveyor 22 and passed under the optical inspection system of camera/controller 24 to make sure that the potato pieces 40 are of acceptable size.

Conveyor 42 is a second variable speed weighbelt, which varies in speed as a function of the weight of potatoes and potato pieces present thereon to maintain a substantially constant mass flow of acceptable potatoes and potato pieces into a slicer 46. If desired, alternate approaches to a weighbelt can be used, such as a system which uses load cells under existing lead screws to weigh potatoes. Potato slices exiting slicer 46 are washed and fried into potato chips.

In an alternative embodiment, prior to slicing, unacceptable materials are first separated from a mixture of acceptable potatoes and oversize potatoes, and oversize potatoes are then divided into acceptably sized potato pieces in the presence of the potatoes that already are of acceptable size. See FIG. 2. According to this embodiment, oversized potatoes are not separated from the acceptable potatoes by being diverted onto a separate oversized potato conveyor. Instead, acceptable and oversize potatoes are carried together on a common conveyor 50 beneath a camera/controller 52 that identifies oversized potatoes, notes their location on conveyor 50, and then commands blades 54 in a downstream blade assembly 56 to selectively divide the oversized potatoes into acceptably sized pieces.

It can be readily seen that the present invention provides substantial improvements in the preparation of whole potatoes for slicing during the production of potato chips. Uniformity of peeling is increased, as in peeler throughput, by maintaining a substantially constant mass flow of potatoes into peeler 12 while automatically adjusting the potato peeler under the feedback control of camera/controller 24. Separating oversized potatoes and foreign materials from acceptable potatoes by diverter gate 28 avoids jamming of and damage to the slicer without the use of manual labor, while optical control of the potato slicing mechanism 38 avoids waste of oversized potatoes and eliminates the manual labor involved in cutting up oversized potatoes by hand. Also, maintaining a substantially constant mass flow of potatoes and potato pieces into slicer 46 by weighbelt 42 maximizes slicer throughput and provides a more stable process.

Since many modifications, variations and changes in detail may be made to the described embodiments, it is intended that all matter in the foregoing description and shown in the accompanying drawings be interpreted as illustrative and not in a limiting sense.

What is claimed is:

1. An automated system for processing whole potatoes, comprising
   (a) an adjustable potato peeler capable of removing varying amounts of potato peel from whole potatoes;
   (b) means for feeding unpeeled potatoes into the peeler and for maintaining a substantially constant mass flow of potatoes into the peeler;
   (c) means for receiving peeled potatoes from the peeler and for conveying peeled potatoes downstream of the peeler;
   (d) means for electromagnetically inspecting potatoes downstream of the peeler to detect the amount of peel removed from potatoes by the peeler, and for adjusting the potato peeler so as to remove substantially uniform amounts of peel from potatoes by the peeler;
   (e) means for electromagnetically identifying foreign material that may be present with the potatoes downstream of the peeler;
   (f) means for electromagnetically inspecting potatoes downstream of the peeler to identify oversized potatoes that exceed a predetermined size limitation; and
   (g) means for separating unacceptable material from acceptable potatoes and oversized potatoes.

2. The automated system of claim 1 wherein said separating means is a diverting means.

3. The automated system of claim 2 wherein said diverting means further separates oversized potatoes from acceptable potatoes and unacceptable material.

4. The automated system of claim 3 further including a potato slicer downstream of the diverting means, and means for maintaining a substantially constant mass flow of acceptable potatoes into the slicer.

5. The automated system of claim 1, further including means for dividing oversized potatoes into potato pieces that are within a predetermined acceptable size limitation.

6. The automated system of claim 3, further including means for dividing oversized potatoes into potato pieces that are within a predetermined acceptable size limitation.

7. The automated system of claim 6, further including a potato slice downstream of the diverting means, and means for maintaining a substantially constant mass flow of acceptable potatoes and potato pieces into the slicer.

8. The automated system of claim 7 wherein the peeler-feeding means is a first variable-speed weighbelt for maintaining a constant mass flow of potatoes into the peeler by varying weighbelt speed as a function of the weight of potatoes thereon, and wherein the means for maintaining a substantially constant mass flow of acceptable potatoes and potato pieces into the slicer is comprised of a second variable speed weighbelt which varies in speed as a function of the weight of potatoes thereon.

9. The automated system of claim 1 wherein the electromagnetically inspecting and identifying means are optically inspecting and identifying means.

10. The automated system of claim 9 wherein the means for inspecting potatoes downstream of the peeler to detect the amount of peel removed from the potatoes by the peeler, the means for identifying foreign material that may be present with the potatoes downstream of the peeler, and the means for inspecting potatoes downstream of the peeler to identify oversized potatoes, is comprised of a single optical inspection and control device.

* * * * *